United States Patent
Suess

(10) Patent No.: US 9,739,646 B2
(45) Date of Patent: Aug. 22, 2017

(54) DISPLAY DEVICE

(76) Inventor: Manfred Suess, Remchingen (DE)

(*) Notice: Subject to any disclaimer, the term of this patent is extended or adjusted under 35 U.S.C. 154(b) by 824 days.

(21) Appl. No.: 13/003,278

(22) PCT Filed: Jun. 19, 2009

(86) PCT No.: PCT/EP2009/004422
§ 371 (c)(1),
(2), (4) Date: May 26, 2011

(87) PCT Pub. No.: WO2010/003535
PCT Pub. Date: Jan. 14, 2010

(65) Prior Publication Data
US 2011/0228513 A1    Sep. 22, 2011

(30) Foreign Application Priority Data

Jul. 11, 2008  (DE) .................. 10 2008 032 596
Dec. 8, 2008  (DE) .................. 10 2008 060 677

(51) Int. Cl.
| F01P 11/16 | (2006.01) |
| G01D 11/28 | (2006.01) |
| B60K 37/02 | (2006.01) |

(52) U.S. Cl.
CPC ............ *G01D 11/28* (2013.01); *B60K 37/02* (2013.01); *B60K 2350/1064* (2013.01); *B60K 2350/203* (2013.01)

(58) Field of Classification Search
CPC ...................................... G01D 11/28
USPC ................. 362/23, 26–30, 471, 489
See application file for complete search history.

(56) References Cited

U.S. PATENT DOCUMENTS

| 2,837,052 A * | 6/1958 | Viret .............................. 116/287 |
| 2,837,053 A | 6/1958 | Viret |
| 3,699,915 A | 10/1972 | Greene |
| 4,233,927 A | 11/1980 | Oikawa et al. |
| 4,807,090 A * | 2/1989 | Mandellos et al. ............. 362/26 |
| 6,499,852 B1 | 12/2002 | Kino et al. |
| 7,207,117 B1 * | 4/2007 | Cook et al. ................... 116/286 |
| 7,549,390 B2 * | 6/2009 | Verdouw ....................... 116/288 |
| 2005/0128733 A1 * | 6/2005 | Clugston et al. .............. 362/23 |

FOREIGN PATENT DOCUMENTS

| DE | 1415175 | 9/1937 |
| DE | 3113773 | 10/1982 |
| DE | 19835208 | 2/2000 |
| EP | 1319553 | 6/2003 |
| FR | 1070767 A | 12/1954 |
| GB | 1047574 A | 11/1966 |
| JP | 2006098125 | 4/2006 |
| WO | 2005002903 | 1/2005 |

OTHER PUBLICATIONS

International Search Report for application No. PCT/EP2009/004422 mailed Oct. 15, 2009.
German Exam Report mailed May 15, 2009.
European Search Report dated May 10, 2013.

* cited by examiner

*Primary Examiner* — Bryon T Gyllstrom
(74) *Attorney, Agent, or Firm* — Fletcher Yoder, P.C.

(57) ABSTRACT

A display instrument for a motor vehicle has a display area visible from a viewing direction. A light source illuminates the display area. A reflector reflects light emitted by the light source. A majority of the light emitted by the light source or reflected being emitted onto the display area or substantially parallel to a main plane of the display area.

10 Claims, 2 Drawing Sheets

DISPLAY DEVICE

CROSS REFERENCE TO RELATED APPLICATIONS

This application claims priority from and the benefit of PCT Application No. PCT/EP2009/004422, filed on Jun. 19, 2009; German Patent No. DE 10 2008 032 596.1, filed on Jul. 11, 2008; and German Patent DE 10 2008 060 677.4, filed on Dec. 8, 2008; all entitled "Display Device", which are herein incorporated by reference.

BACKGROUND

The invention relates to a display device, in particular for use in the automotive sector.

Motor vehicle instrument clusters with displays which can be illuminated by a light source are available on the market with numerous configurations. It is known to pass light generated by light-emitting diodes or incandescent lamps via fiberoptic conductors to the displays to be illuminated. In addition, document WO 2005/002903 A1 has also disclosed using reflective surfaces for backlighting display areas in display instruments.

SUMMARY

The invention is based on the object of configuring a display device with a structurally simple design such that the light emitted by a light source with the highest possible luminous efficacy is used for illuminating the displays, with it being possible in particular for a comparably simple and stable structural design of the display instrument to be selected.

According to the invention, the object is achieved by a display instrument, in particular for a motor vehicle, the display instrument having a display area which is visible from a viewing direction and a light source which illuminates the display area, the display instrument having a reflector for reflecting the light emitted by the light source, and it being provided that the majority of the light emitted by the light source or reflected is emitted onto the display area or substantially parallel to the main plane of extent thereof.

It is thus advantageously possible according to the invention for the light source to be arranged behind the display area, for example, and nevertheless to implement front lighting with a high luminous efficacy (and not backlighting) of the display area, with the result that a large number of display elements to be illuminated or lit up can be realized with comparatively few components or light sources and nevertheless the use of the display instrument is not affected by glare.

An essential feature of the invention consists in using at least one light-reflecting reflective surface for directing light emitted by the light source into the inner region of the instrument cluster and/or towards the display to be illuminated.

In the interest of reducing the number of component parts required, in accordance with one variant embodiment of the invention, a reflective surface of a component part which is already provided in any case on the display device for another purpose than the present purpose is used. As a result, the display instrument according to the invention can be produced in a particularly cost-effective manner.

According to the invention, it is preferred that the display instrument has a pointer, which is capable of moving mechanically in the region of the display area in a pointer plane, it being provided that light emitted by the light source is emitted onto the pointer or substantially in the pointer plane. It is thus possible, according to the invention, to also illuminate the mechanically movable pointer, in addition to illuminating display elements in the region of the display area or on the display area, with the result that said pointer no longer requires its own lighting, for example in the form of a fiberoptic conductor and a dedicated light source emitting light into the fiberoptic conductor, in order to ensure good readability even in poor lighting situations, in particular at night.

According to the invention, it is further preferred that the reflector is provided in a peripheral region of the display area, the reflector having in particular at least one sloping surface. As a result, it is possible according to the invention, for example, for the light sources to be capable of being arranged circumferentially around the edge of a substantially round display area and to emit light either directly in the pointer plane, which is located in front of the display area, when viewed from the viewing direction, or else to emit light into this pointer plane via one or more reflections. For example, the display area can in this way be illuminated by means of three, by means of four, by means of five, by means of six, by means of seven or by means of eight light sources, in particular light-emitting diodes.

Furthermore, it is preferred according to the invention that the reflector is provided at least partially and in particular in its reflective surface region from a substantially white material. It is thus possible using simple means, for example by producing the reflector from a white material which in particular also has a comparatively high level of gloss, in particular in its surface region, to achieve a good reflective effect and therefore a comparatively good luminous efficacy.

In addition, it is preferred according to the invention that the reflector, when viewed from the viewing direction, has a cover, in particular a cover in the form of an ornamental ring. It is thus possible according to the invention to implement the lighting of the display area according to the invention in a manner which is discreet and esthetically appealing. In particular, it is thus possible according to the invention for a user of the display instrument not to be affected by any glare, for example as a result of parasitic light emerging from the light source.

According to the invention, it is also particularly preferred if the display instrument has a printed circuitboard behind the display area, from the viewing direction, or if the light source is provided so as to be mounted on the printed circuitboard. As a result, it is advantageously possible according to the invention for the display instrument to be capable of being produced particularly easily, cost-effectively and robustly, with the result that good functionality despite comparatively low costs is possible over the service life.

A further subject matter of the present invention relates to a motor vehicle with a display instrument according to the invention.

DRAWINGS

An embodiment of the invention, which should be interpreted purely by way of example, will be described in more detail with reference to the attached drawing.

DETAILED DESCRIPTION

Figure 1:
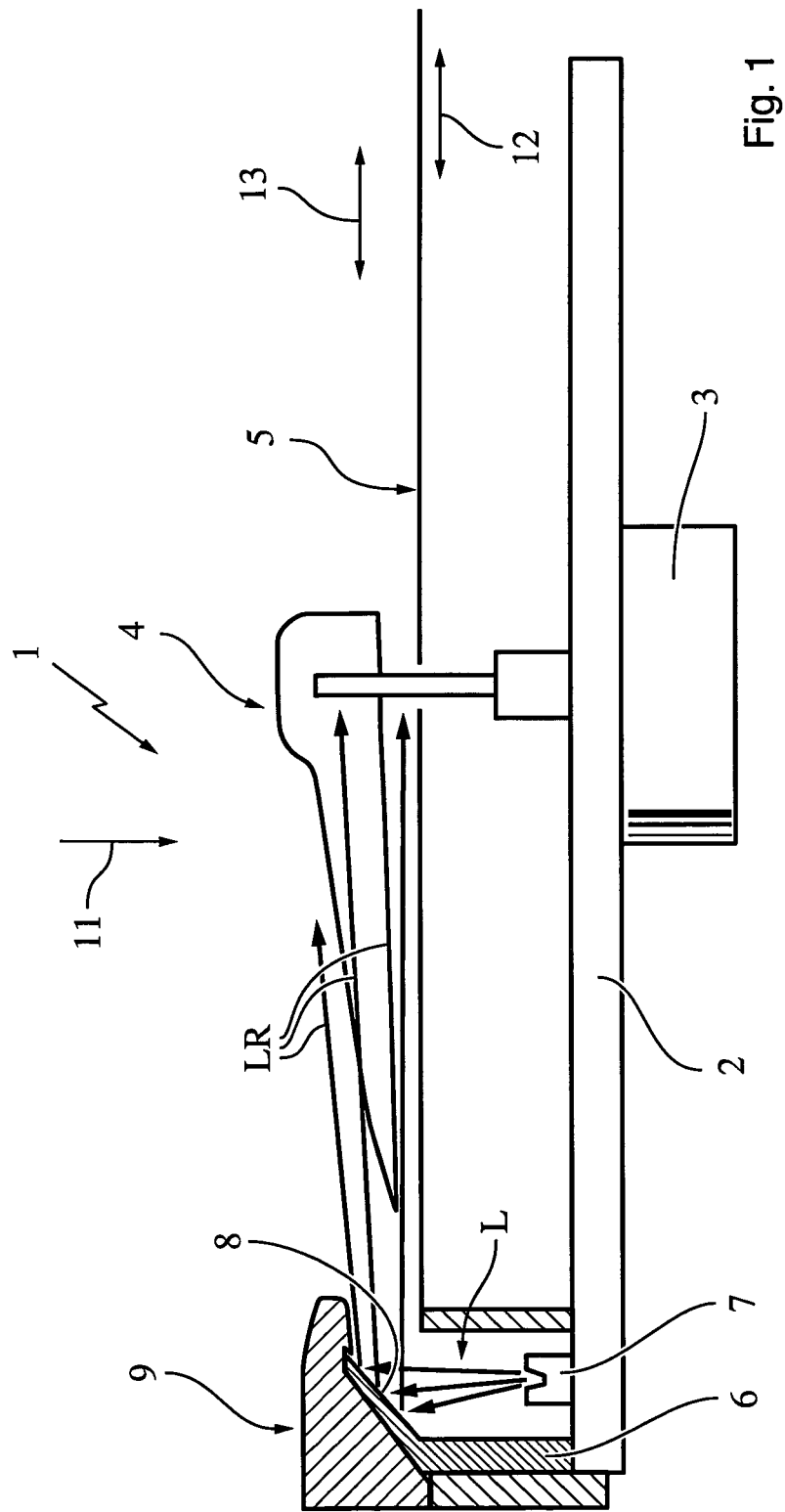
FIG. 1 shows a schematic sectional illustration of a display instrument according to the invention, but the illustration only includes part of the display instrument.

FIG. 1 shows a partial illustration of a section through a display instrument 1 of a motor vehicle, which will also be referred to as an instrument cluster 1 below. In the exemplary embodiment illustrated, the instrument cluster 1 comprises a printed circuitboard 2, on which a stepper motor 3 for moving a pointer 4 is fitted, for example.

The display instrument 1 comprises a display area 5, which, in interaction with the pointer 4, is in particular in the form of a dial and will also be referred to below as dial 5. The pointer 4 is mounted rotatably and in front of the dial 5 (when viewed from a viewing direction 11), the dial being provided with a scale for the measurement variable to be indicated, such as vehicle speed, for example, in the exemplary embodiment illustrated. Using the angular position of the pointer 4 driven by the stepper motor 3, the present or instantaneous value for the respective measurement variable is indicated.

Light rays L are emitted by a light source 7, which, in the exemplary embodiment illustrated, is likewise fitted on the printed circuitboard 2 and is provided in particular in the form of a light-emitting diode 7, and, in the exemplary embodiment illustrated, these light rays run approximately perpendicular to a geometric plane in which the dial 5 is arranged and which is also referred to below as the main plane of extent 12 of the dial 5 or the display area 5.

The light rays L emitted by the light-emitting diode 7 impinge on a sloping surface 8 provided on a reflector 6, which sloping surface is skewed through an angle of 45°, for example, with respect to the mentioned geometric plane (and therefore also with respect to the light rays L emitted by the light-emitting diode 7). The reflector 6 and the sloping surface 8 are in particular manufactured from a white material and have at least one substantially white surface.

The reflector 6 is in particular provided already on the instrument cluster 1 in any case for another purpose than the present purpose, for example as a decorative element, and is also used with the solution according to the invention.

When they are reflected on the sloping surface 8, the light rays L emitted by the light-emitting diode 7 are deflected by approximately 90°. The reflected light rays LR propagate from the sloping surface 8 into the inner region of the instrument cluster onto the elements to be illuminated, in particular the scale region of the display area 5 and the pointer 4. In this case, the reflected light rays LR run substantially in a pointer plane 13 and therefore substantially parallel to the main plane of extent 12 of the display area 5.

An ornamental ring 9 (or design ring) which is provided in any case already on the display instrument 1 is also used for the purpose of acting as a light barrier and, for this purpose, is arranged or fixed on the instrument cluster 1 in such a way that it is not possible for any direct light to shine into the driver's eye.

The invention implements slit lighting, which manages without any fiberoptic conductors, with the result that it is possible for the display instrument to be produced in a particularly cost-effective manner.

Figure 2:
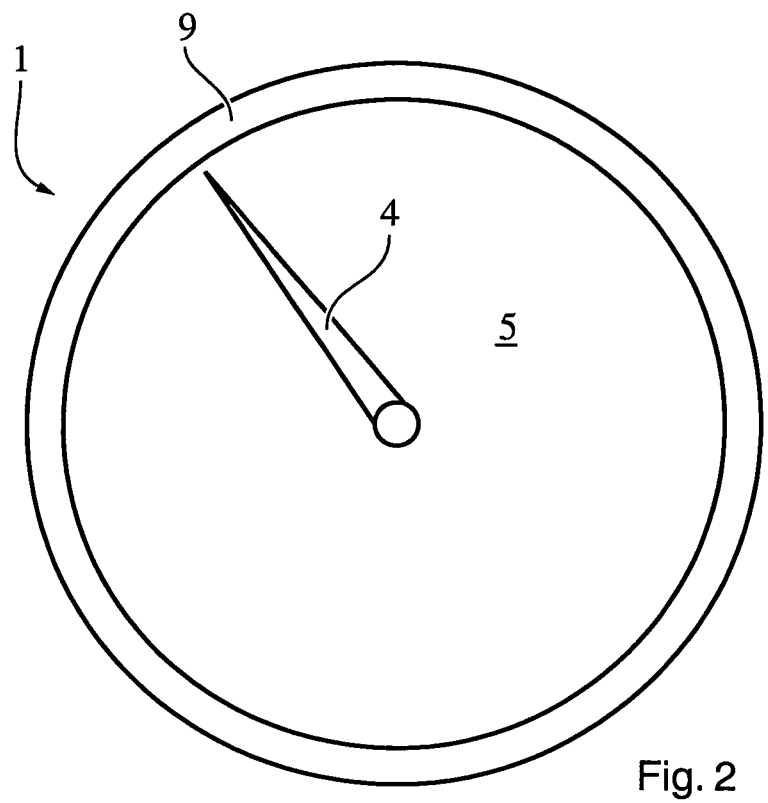
FIG. 2 shows a schematic plan view of the display instrument according to the invention.

FIG. 2 illustrates a schematic of a plan view of the display instrument 1, the display area 5, the pointer 4 and the ornamental ring 9 being shown.

LIST OF REFERENCE SYMBOLS

1 Display instrument/instrument cluster
2 Printed circuitboard
3 Stepper motor
4 Pointer
5 Display area/Dial
6 Reflector
7 Light source/Light-emitting diode
8 Sloping surface
9 Ornamental ring
11 Viewing direction
12 Main plane of extent of display area
13 Pointer plane
L Light rays
LR Reflected light rays

The invention claimed is:

1. A display instrument for a motor vehicle, comprising:
a display area which is visible from a viewing direction;
a pointer configured to mechanically move in a region of the display area within a pointer plane above the display area relative to the viewing direction, wherein a surface of the display area is directly adjacent to the pointer;
a printed circuitboard disposed behind the display area relative to the viewing direction;
a light source configured to emit light to illuminate the display area;
a reflector at a position above the display area relative to the viewing direction, and configured to reflect the light emitted by the light source, wherein the reflector is part of a decorative element; and
a wall extending between the printed circuitboard and the surface of the display area, wherein the wall is configured to block parasitic light emitting from the light source;
wherein a majority of the light emitted by the light source, the light reflected by the reflector, or some combination thereof, is emitted onto the surface of the display area or substantially parallel to a main plane thereof, and at least a portion of the light emitted by the light source, the light reflected by the reflector, or some combination thereof, is emitted substantially in the pointer plane, and wherein the light source comprises a light-emitting diode mounted to the printed circuitboard.

2. The display instrument as claimed in claim 1, wherein the reflector is provided in a peripheral region of the display area, the reflector having at least one sloping surface.

3. The display instrument as claimed in claim 1, wherein the reflector comprises at least partially a substantially white material.

4. The display instrument as claimed in claim 3, wherein the reflector comprises a substantially white material in a reflective surface region.

5. The display instrument as claimed in claim 1, wherein the decorative element comprises a cover visible when viewed from the viewing direction.

6. The display instrument as claimed in claim 5, wherein the cover comprises an ornamental ring.

7. A motor vehicle with a display instrument as claimed in claim 1.

8. A display instrument for a motor vehicle, comprising:
a display area configured to be visible from a viewing direction;
a pointer configured to mechanically move in a region of the display area within a pointer plane above the display area relative to the viewing direction, wherein a surface of the display area is directly adjacent to the pointer;
a printed circuitboard disposed behind the display area relative to the viewing direction;

a light source configured to emit light to illuminate the display area, wherein the light source comprises a light-emitting diode mounted to the printed circuitboard;

a decorative element comprising a reflector at a position above the display area relative to the viewing direction, wherein the reflector is configured to reflect at least a portion of the light emitted by the light source; and a wall extending between the printed circuitboard and the surface of the display area, wherein the wall is configured to block parasitic light emitting from the light source;

wherein the portion of the light reflected by the reflector is emitted substantially in the pointer plane.

9. The display instrument of claim 8, wherein the decorative element comprises a cover visible when viewed from the viewing direction.

10. The display instrument of claim 9, wherein the cover comprises an ornamental ring.

* * * * *